US012444376B2

(12) United States Patent
Xu et al.

(10) Patent No.: US 12,444,376 B2
(45) Date of Patent: Oct. 14, 2025

(54) METHODS AND APPARATUS TO CONTROL BACKLIGHT DRIVERS

(71) Applicant: Texas Instruments Incorporated, Dallas, TX (US)

(72) Inventors: Xiaoxiao Xu, Shanghai (CN); Chih Pu Yeh, Shanghai (CN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 18/423,014

(22) Filed: Jan. 25, 2024

(65) Prior Publication Data

US 2025/0246158 A1 Jul. 31, 2025

(51) Int. Cl.
*G09G 3/34* (2006.01)

(52) U.S. Cl.
CPC ....... *G09G 3/3426* (2013.01); *G09G 2310/08* (2013.01); *G09G 2320/062* (2013.01); *G09G 2320/064* (2013.01); *G09G 2340/16* (2013.01)

(58) Field of Classification Search
CPC ............. G09G 3/3426; G09G 2310/08; G09G 2320/062; G09G 2320/064; G09G 2340/16
See application file for complete search history.

(56) References Cited

U.S. PATENT DOCUMENTS

2016/0014384 A1* 1/2016 Hosoki ................ G09G 3/3413 348/791
2016/0042708 A1* 2/2016 Wang .................. G09G 3/3611 345/214
2023/0086380 A1* 3/2023 Charisoulis ........ G01R 31/2635 345/691

OTHER PUBLICATIONS

"48-Channel, 16-bit, PWM LED Driver with Internal Current Settings," Texas Instruments, Oct. 2020, 51 pages.

* cited by examiner

*Primary Examiner* — Towfiq Elahi
(74) *Attorney, Agent, or Firm* — Valerie M. Davis; Frank D. Cimino

(57) ABSTRACT

Example Light Emitting Diode (LED) driver circuitry includes: memory; and programmable circuitry configured to: identify a first LED within a first row of a grid of LEDs; identify a second LED within a second row of the grid of LEDs; turn the first LED off at a first time, the first time based on an update from a first image frame to a second image frame; and turn the second LED off at a second time, the second time based on the update from the first image frame to the second image frame, the second time different from the first time.

20 Claims, 8 Drawing Sheets

METHODS AND APPARATUS TO CONTROL BACKLIGHT DRIVERS

TECHNICAL FIELD

This description relates generally to displays, and, more particularly, to methods and apparatus to control backlight drivers.

BACKGROUND

Consumers have access to a wide variety of devices with displays (e.g., mobile phones, tablets, computer monitors, televisions, etc.). The displays may be used in any number of use cases (e.g., work, educational, personal, etc.). Accordingly, industry members seek to develop displays that produce images which are both aesthetically pleasing and medically safe for users. For example, designers generally utilize display technology with the goal of reducing eye fatigue such as burning itchiness, tiredness, etc. on a user's eyes caused by prolonged exposure to display.

SUMMARY

For methods and apparatus to control backlight drivers, example Light Emitting Diode (LED) driver circuitry includes: memory; and programmable circuitry configured to: identify a first LED within a first row of a grid of LEDs; identify a second LED within a second row of the grid of LEDs; turn the first LED off at a first time, the first time based on an update from a first image frame to a second image frame; and turn the second LED off at a second time, the second time based on the update from the first image frame to the second image frame, the second time different from the first time.

BRIEF DESCRIPTION OF THE DRAWINGS

The same reference numbers or other reference designators are used in the drawings to designate the same or similar (functionally and/or structurally) features.

DETAILED DESCRIPTION

Figure 1:
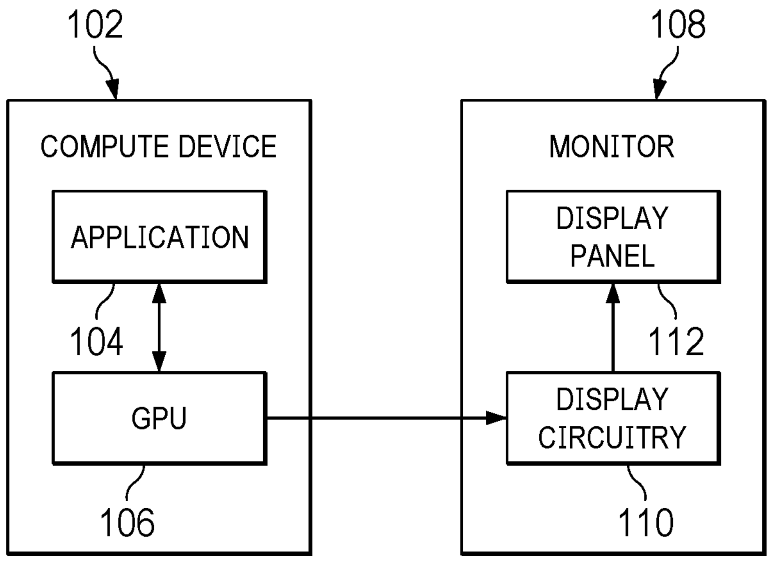
FIG. 1 is a block diagram of an example implementation of a computer and a display.

The drawings are not necessarily to scale. Generally, the same reference numbers in the drawing(s) and this description refer to the same or like parts. Although the drawings show regions with clean lines and boundaries, some or all of these lines and/or boundaries may be idealized. In reality, the boundaries and/or lines may be unobservable, blended and/or irregular.

Industry members use a variety of technologies to present an image on a screen. For example, Liquid Crystal Displays (LCDs) refer to devices that use a backlight, polarization lenses, and Red, Green, and Blue (RGB) panes to present an image. In general, the backlight refers to white light that is generated behind a screen (e.g., in the back) and is applied evenly across the screen. A backlight may generate white light using LEDs. Some backlights implement a single row of LEDs, while other backlights implement multiple rows (e.g., a grid) of LEDs.

An LCD device may decrease the brightness of a region by applying a voltage to a field of liquid crystals in front of the backlight, thereby changing the orientation of the crystals and creating a polarization effect that blocks some of the white light from reaching the screen. The LCD device may change the color of an image by: (a) passing the white light through RGB subpixels, and (b) applying a voltage to transistors that change the amount of light that passes through an individual subpixel (thereby achieving a specific color in the pixel as a whole).

While LCD devices do support sharp and/or high-quality images, the changing liquid crystal polarization and intensity of RGB panes can lead to some LCDs updating images slower than other display technologies (e.g., Cathode Ray Tubes (CRTs)). In some LCD devices, the display has a response time between approximately 12 and 16 milliseconds (ms). Such a lag can lead to motion blur when the display is updating rapidly (e.g., to present a high-speed object and/or a fast-paced scene on video). In some examples, the frequent use of dynamic images in media can lead to LCDs with prolonged motion blur and eye fatigue for viewers.

LCD devices use various techniques to mitigate eye fatigue. In some examples, an LCD controller orients the liquid crystals to block all of the white light at periodic intervals. Such a technique causes a viewer to see a black screen in between frames of video. The view of the black screen can cause a flickering effect that decreases the quality of the viewing experience. Furthermore, LCD devices that block white light through polarization may need to double the frame rate of video to properly synchronize motion on the colored frames around the black frames. Some LCD devices may be unable to meet the increased frame rate requirement and suffer from unsynchronized video as a result. Other LCD devices may be able to double the frame rate but consume additional power in doing so.

Other LCD devices may attempt to mitigate eye fatigue by turning the backlight itself off at periodic intervals. Turning the backlight off may require the LCD to operate the backlight at a doubled refresh rate to properly synchronize motion on the colored frames around black frames that appear on the screen. Similar to the foregoing technique, the increased refresh requirement may cause unsynchronized video and/or additional power consumption. Furthermore, while turning the backlight off at periodic intervals may reduce some motion blur caused by eye movement, it does not address motion blur caused when the LDC changes between color frames. Accordingly, LCD devices that turn the backlight panel off may still lead to eye fatigue over prolonged periods.

Other LCD devices attempt to mitigate eye fatigue by turning off particular rows of the backlight when the LCD panel and RGB panes are transitioning between frames. While such a technique may reduce some motion blur, LCD controllers use individual data streams for each individual region that is turned off. The multiple LED data streams require an LCD controller and corresponding backlight to communicate over multiple channels. Such a requirement limits the applicability of the technique as many LCD controllers are produced with only a single pin/port/channel dedicated to communicating with the backlight.

LCD devices that use multiple data streams to control regions of a backlight send timing information for when to turn the backlight region off, in addition to other information that is typically sent between normal frames of video (e.g., data describing how bright a particular region should be to properly present an image on a screen). The additional timing data may require an LCD device using such technique to double the rate at which it sends data over a communication channel. Similar to the foregoing techniques, the increased data requirement may cause unsynchronized video and/or additional power consumption.

Example methods, apparatus, and systems described herein prevent eye fatigue in LCD devices using a single data stream (e.g., a single communication channel) between the LCD controller and the backlight. Example LED drivers control individual LEDs in a grid, where a given LED provides white light that corresponds to one or more pixels on the screen. First LED driver circuitry receives a data stream from the LCD controller describing brightness and video synchronization data for respective frames. The LED driver circuitry then uses the video synchronization data to determine when to turn off first LEDs connected to the driver. In particular, the LED driver circuitry turns LEDs off so that the corresponding pixels are not lit during the period when the RGB panels change intensity to update frames. The first LED driver circuitry also forwards the unedited data stream to second example LED driver circuitry, which uses the same information to determine when to turn off second LEDs connected to the driver. Furthermore, the timing data determined by the example LED drivers is specific to and configurable for individual LEDs connected to the controller. As a result, the LED drivers can tune the timing of: a) when a particular LEDs turns off, and/or b) how long the LED stays off, to account for any variations in RGB subpixel refresh rates. As such, the example LED drivers can be used with a wide variety of LCD controllers (including those that have a single communication channel for backlight), account for variations in user visual preferences, and reduce eye fatigue.

FIG. 1 is a block diagram of an example implementation of a compute device 102 and a monitor 108. The example compute device 102 includes an example application 104 and an example Graphics Processor Unit (GPU) 106. The example monitor 108 includes example display circuitry 110 and an example display panel 112.

The application 104 refers to machine-readable instructions that, when executed, cause the compute device 102 to perform operations. The operations may refer to any type of use case or task. For example, the application 104 may cause the compute device 102 to present media, browse the Internet, etc. The application 104 may be executed by any type of programmable circuitry. Examples of programmable circuitry include but are not limited to programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs).

The GPU 106 causes the monitor 108 to present visual data (e.g., a film, a television show, a user interface, etc.) based on instructions from the application 104. For example, the GPU 106 may receive instructions from the application 104 to resize a window. The GPU 106 then determines the colors values of pixels needed to form a series of video frames that, when displayed sequentially on the monitor 108, animate the resizing of the window. The example GPU 106 determines the series of images based on instructions from multiple applications. As used above and herein, visual data may refer to a sequence of video frames. In some examples, video data also refers to corresponding audio data.

In some examples, the GPU 106 implements the application 104 (e.g., executes the machine-readable instructions that form the application 104). In other examples, a different type of programmable circuitry implements the application 104 and provides instructions to the GPU 106 during the performance of application 104 operations.

The example display circuitry 110 causes the display panel 112 to present a series of images. To do so, the display circuitry 110 determines when to turn the backlight off, which regions of the backlight to turn off, and when to change the intensity of the RGB subpixels. The display circuitry 110 is discussed further in connection with FIG. 2.

The example display panel 112 includes a backlight, one or more liquid crystal polarization layers, and RGB subpixels. Collectively, the components of the display panel 112 form a screen that presents images. The images are based on signals provided by the display circuitry 110 as described above. The display panel 112 is discussed further in connection with FIG. 2.

Figure 2:
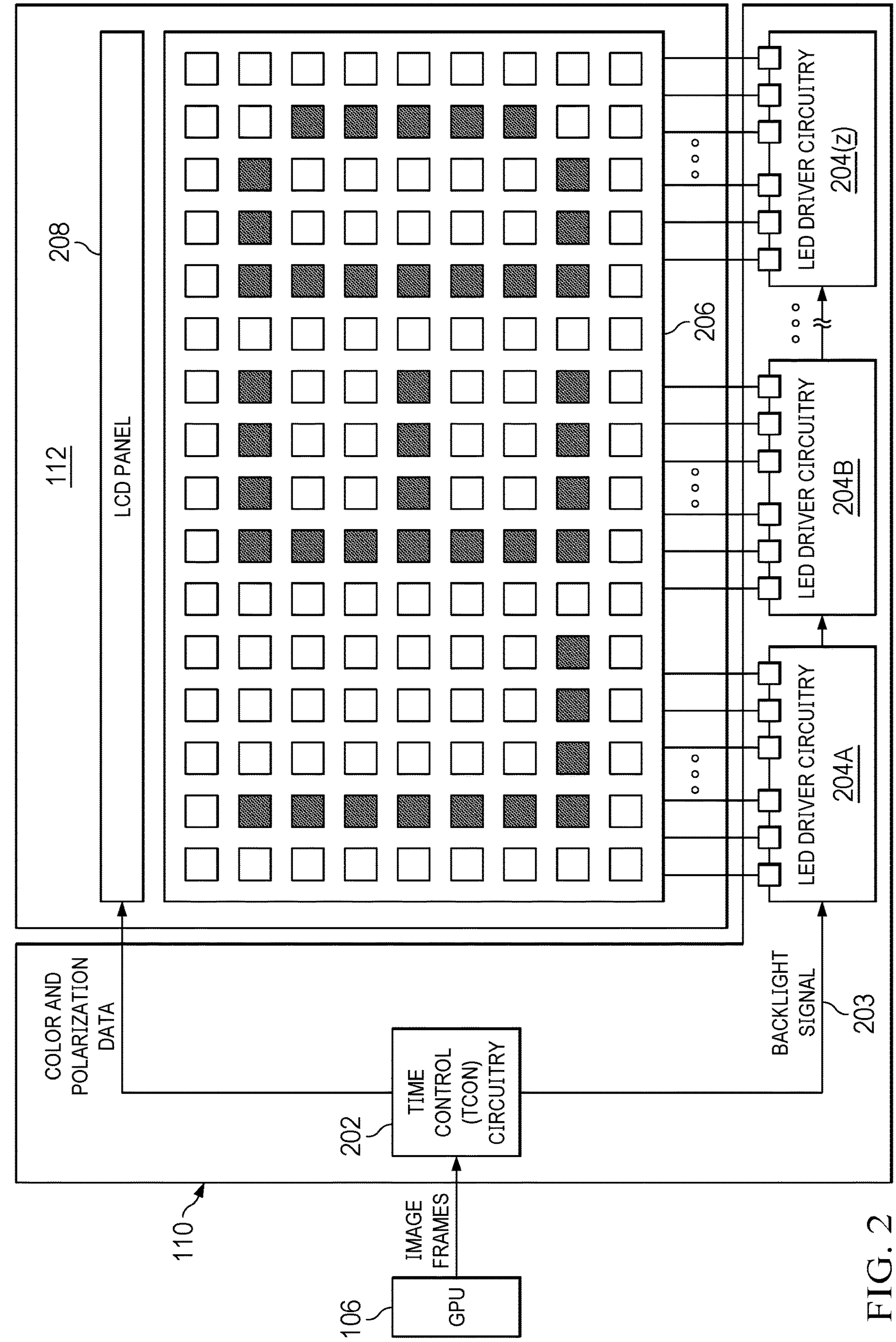
FIG. 2 is a block diagram of an example implementation of the display circuitry and the display panel of FIG. 1.

FIG. 2 is a block diagram of an example implementation of the example display circuitry 110 and the example display panel 112 of FIG. 1. The display circuitry 110 includes example time control (TCON) circuitry 202, an example backlight signal 203, and example LED driver circuitry 204A, 204B, . . . , 204(*z*) (collectively referred to as LED drivers 204). In some examples, the LED drivers 204 may be referred to as backlight drivers. The display panel 112 includes an example LED panel 206 and an example LCD panel 208.

The TCON circuitry 202 receives image frames from the GPU 106. As used herein, an image frame refers to data that enables the display circuitry 110 to present an image on the display panel 112. In some examples, the image frames received by the TCON circuitry 202 may also be referred to as video stream data. The TCON circuitry 202 uses the image frames to determine the backlight signal 203. The backlight signal 203 includes timing and brightness data that controls the LED panel 206 as discussed further below. The TCON circuitry 202 also uses the image frames to determine color and polarization data that is transmitted to the LCD panel 208.

In some examples, the TCON circuitry 202 is implemented as a System on a Chip (SoC). The TCON circuitry 202 may be manufactured and/or designed independently from the other components in the monitor 108. The TCON circuitry 202 may be implemented by any type of programmable circuitry.

The LED drivers 204 control the LED panel 206 based on the teachings described herein. A given LED driver circuitry 204A is connected to a subset of LEDs on the LED panels. The LED driver circuitry 204A uses the backlight signal 203 to determine when to turn the subset of LEDs off during a frame transition. For example, the LED driver circuitry 204A may turn off LEDs within its connected subset at different times such that a given LED is off when a corresponding set of RGB subpixels changes values (e.g., changes colors as part of a frame transition).

The LED drivers 204 may refer to any number of individual LED driver circuits. In some examples, the number of LED drivers 204 depends on the number of LEDs in the LED panel 206. A given LED driver circuitry 204A may be implemented by any type of programmable circuitry. The LED drivers 204 are discussed further in connection with FIGS. 3-8.

Within the display panel 112, The LED panel 206 is a grid of connected LEDs that collectively form the backlight. That is, the LED panel 206 generates white light that is used to produce images on the monitor 108. The LED panel 206 may include any number of LEDs per pixel. The LED panel 206 is discussed further in connection with FIG. 4.

Within the display panel 112, the LCD panel 208 is positioned in front of and is lit by the LED panel 206. The LCD panel 208 includes liquid crystal polarization layers to prevent some white light (generated by the LED panel 206) from passing through LCD panel 208 and reaching the screen. The LCD panel 208 also uses the RGB subpixels to color shift some regions of the white light before the light reaches the screen. By blocking and color shifting light using color and polarization data from the TCON circuitry 202, the LCD panel 208 produces image frames on a screen that were initially described by the GPU 106. Accordingly, for a given image frame, the color and polarization data may include analog and/or digital signals that describe which liquid crystals to polarize, an amount of polarization for the identified regions, red intensity, green intensity, and blue intensity data for each pixel, etc. The color and polarization data also includes timing data that describes when the LCD panels 208 should update the liquid crystals and RGB subpixels to present the next image frame.

In the example of FIG. 2, the LED drivers 204 distribute a common signal (e.g., the backlight signal 203) using a series connection between one another. For example, the LED driver circuitry 204A receives the backlight signal 203 from the TCON circuitry 202 and uses the signal to control a first subset of LEDs. The LED driver circuitry 204A also forwards a copy of the backlight signal 203 to the LED driver circuitry 204B, which forwards a copy to the LED driver circuitry 204C, etc. Similarly, the LED driver circuitry 204B controls a second subset of LEDs, the LED driver circuitry 204C controls a third subset of LEDs, etc.

Advantageously, the distribution of a common backlight signal 203 by the LED drivers 204 enables the monitor 108 to be implemented to any type of TCON circuitry 202 that uses a single communication channel to control the LED panel 206. Accordingly, the LED drivers 204 may decrease complexity and support a wider variety of use cases than motion blur techniques that rely on TCON circuitry with multiple interfaces to a backlight.

Figure 3:
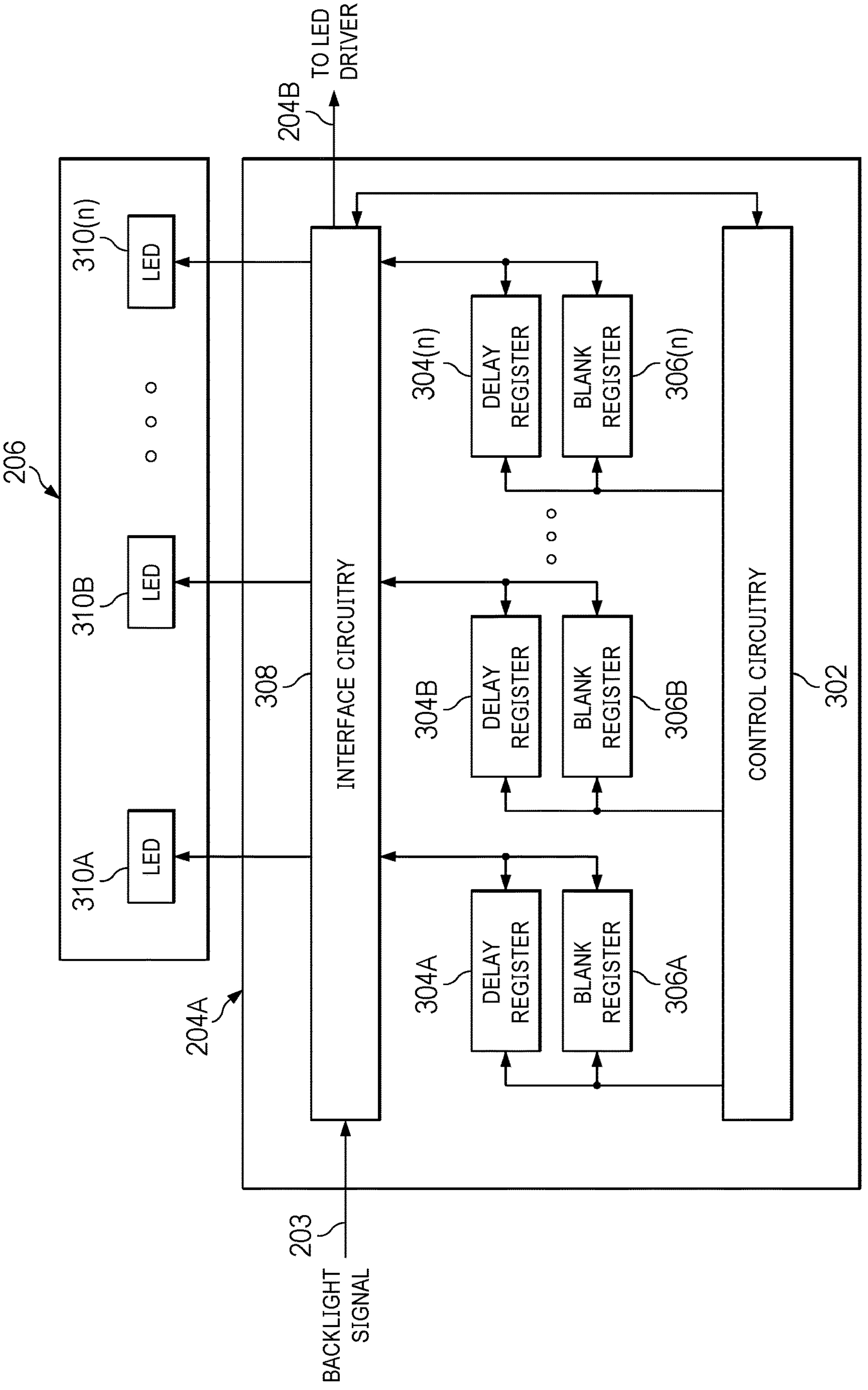
FIG. 3 is a block diagram of an example implementation of a Light Emitting Diode (LED) driver circuitry of FIG. 2.

FIG. 3 is a block diagram of an example implementation of a LED driver circuitry 204A of FIG. 2. The LED driver circuitry 204A of FIG. 2 may be instantiated (e.g., creating an instance of, bring into being for any length of time, materialize, implement, etc.) by programmable circuitry such as a Central Processor Unit (CPU) executing first instructions. Also, the LED driver circuitry 204A of FIG. 2 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. Some or all of the circuitry of FIG. 2 may, thus, be instantiated at the same or different times. Some or all of the circuitry of FIG. 2 may be instantiated, for example, in one or more threads executing concurrently on hardware and/or in series on hardware. Moreover, in some examples, some or all of the circuitry of FIG. 2 may be implemented by microprocessor circuitry executing instructions and/or FPGA circuitry performing operations to implement one or more virtual machines and/or containers. While examples described herein may refer to the LED driver circuitry 204A, the teachings of this description can also be used to implement any of the other LED driver circuits 204B, 204(*z*).

The example of FIG. 3 includes the LED driver circuitry 204A and the LED panel 206. The LED driver circuitry 204A includes example control circuitry 302, example delay registers 304A, 304B, . . . , 304(*n*) (collectively referred to as delay registers 304), example blank registers 306A, 306B, . . . , 306(*n*) (collectively referred to as blank registers 306), and example interface circuitry 308. The LED panel 206 includes example LEDs 310A, 310B, . . . , 310(*n*) (collectively referred to as LEDs 310).

The interface circuitry 308 enables the exchange of data between internal components of the LED driver circuitry 204A and other devices. For example, the interface circuitry 308 receives the backlight signal 203 from the TCON circuitry 202 and provides the signal to the control circuitry 302. The interface circuitry 308 also provides a copy of the backlight signal 203 to the LED driver circuitry 204B based on instructions from the control circuitry 302. Finally, the interface circuitry 308 provides individualized control signals to the LEDs 310. The individualized control signals are based on the contents of the delay registers 304 and the blank registers 306, and instructions from the control circuitry 302 as discussed further below.

The interface circuitry 308 may include transceivers, antennas, and/or other hardware components required to send and receive signals with the TCON circuitry 202, the LED driver circuitry 204B, the LEDs 310, and the control circuitry 302. Similarly, the interface circuitry 308 may implement any number and wired and/or wireless communication protocols to enable the exchange of data with the foregoing components. In some examples, the interface circuitry 308 includes one pin or port per LED in the LEDs 310. In some examples, the interface circuitry 308 is instantiated by programmable circuitry executing interface instructions and/or configured to perform operations such as those represented by the flowchart(s) of FIG. 7.

The control circuitry 302 coordinates the operations of the LEDs 310, and the operations of the other components of the LED driver circuitry 204A, based on the teachings described herein. For example, the control circuitry 302 populates (e.g., stores values in) the delay registers 304 and the blank registers 306 based on the contents of the backlight signal 203. The control circuitry 302 then instructs the interface circuitry 308 to turn ones of the LEDs 310 on or off based on timing data stored in the registers. In some examples, the control circuitry 302 is instantiated by programmable circuitry executing control instructions and/or configured to perform operations such as those represented by the flowchart(s) of FIG. 7. The control circuitry 302 is discussed further in connection with FIG. 3.

When the visual data from the GPU 106 indicates the monitor 108 should update from a first image frame to a second image frame, propagation delay and/or signal processing delays prevents the display panel from instantaneously updating to the second image frame. Rather, different pixels update color and polarization values at different times based on the position of the pixel within the screen. To reduce eye fatigue and prevent motion blur while the pixel is transitioning between image frames, the control circuitry 302 causes the LEDs 310 to turn off at different times. To do so, the control circuitry 302 populates the delay registers 304 to describe when the interface circuitry 308 should turn off particular LEDs 310 during an image frame transition. That is, the delay register 304A describes the delay before LED 310A is turned off, the delay register 304B describes the delay before the LED 310B is turned off, etc.

The control circuitry 302 also populates the blank registers 306 to describe how long the interface circuitry 308 should wait, after turning a particular LED off at the beginning of a pixel transition, to turn the particular LED back on. That is, the blank register 306A describes how long the LED 310A remains off, the delay register 306B describes how long the LED 310B remains off, etc.

The delay registers 304 and the blank registers 306 may be implemented by any type of memory. For example, the delay registers 304 and the blank registers 306 may be a volatile memory or a non-volatile memory. The volatile memory may be implemented by Synchronous Dynamic Random Access Memory (SDRAM), Dynamic Random Access Memory (DRAM), and/or any other type of RAM device. The non-volatile memory may be implemented by flash memory and/or any other desired type of memory device. In some examples, one or more of the delay registers 304 and blank registers may be implemented as separate registers in a singular memory device.

By causing LEDs 310 to turn off based on the delay registers 304 and to turn back on based on the blank registers 306, the control circuitry 302 prevents the generation of white light behind a set of RGB subpixels as said RGB subpixels update to represent the pixel color of the subsequent image frame. Similarly, the other LED driver circuits 204B, . . . , 204(*z*) turn respective LEDs off for specific periods based on when corresponding pixels are transitioning between image frames. Collectively, the LED drivers 204 can prevent users from viewing any part of the image frame transition, thereby reducing motion blur and eye fatigue.

Advantageously, the control circuitry 302 can use the backlight signal 203 to calculate different values amongst the delay registers 304 and the blank registers 306. Such configurability enables the LED driver circuitry 204A to support a wide variety of use cases (e.g., nonuniform mappings between LEDs in the LED panel 206 and LED drivers 204, variations in the LCD panel 208 between RGB panel or polarization update times, etc.).

Figure 4:
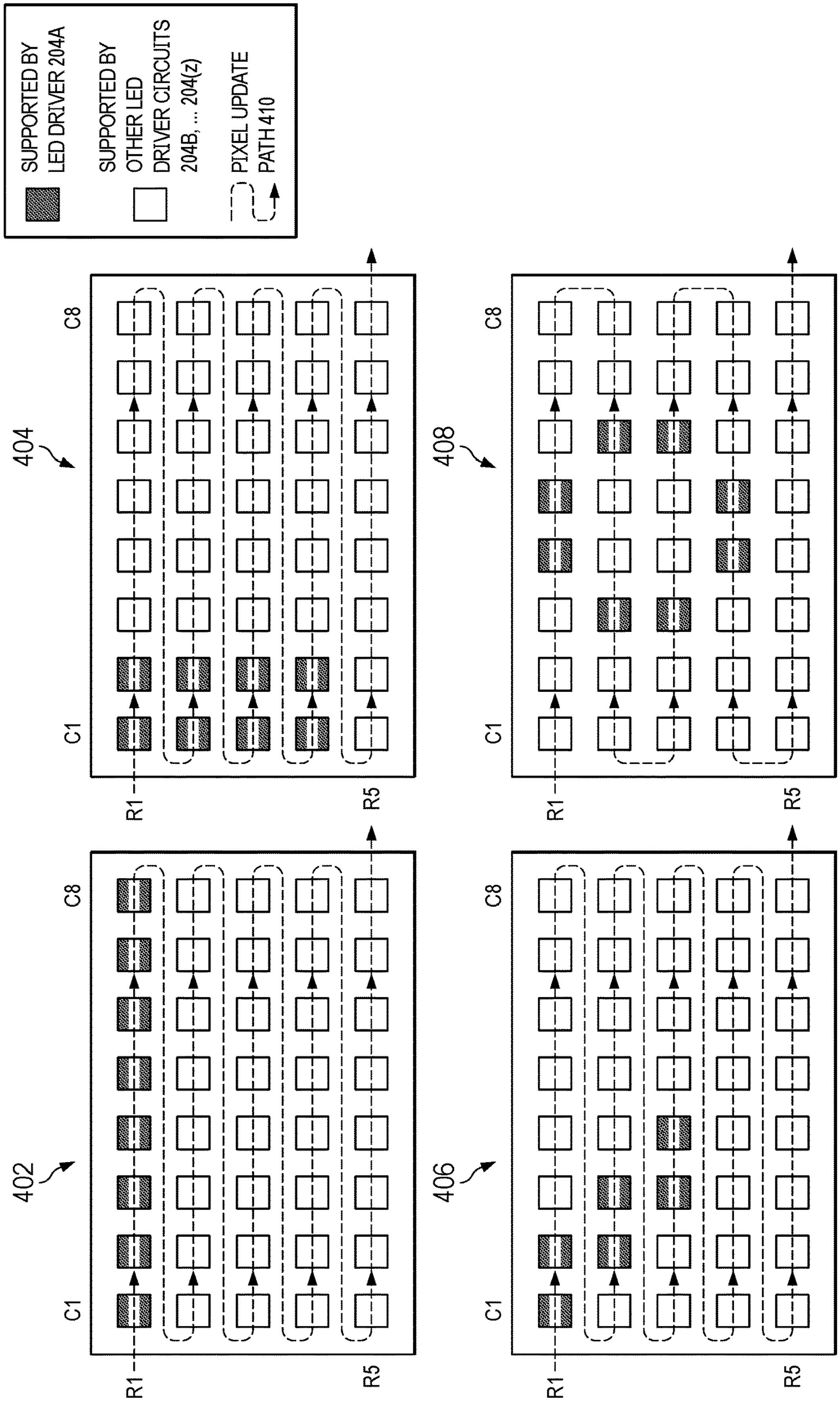
FIG. 4 is an illustrative example of various configurations that may be used to connect the LED panel to the LED drivers of FIG. 2.

FIG. 4 is an illustrative example of various configurations that may be used to connect the LED panel 206 to the LED drivers 204 of FIG. 2. FIG. 4 includes example configurations 402, 404, 406, and 408, and an example pixel update path 410.

The configurations 402, 404, 406, and 408 are example implementations of the LED panel 206 of FIG. 2. The squares within the configurations 402, 404, 406, and 408 represent pixels, which are labelled with row and column indices. As used herein with reference to FIG. 4, the location of a particular LED within the LED panel 206 may be described as ordered pair (r_x, c_y), where _x is a positive integer from one to five, and _y is a positive integer from one to eight. In the example of FIG. 4, the LED driver circuitry 204A connects to eight LEDs. In other examples, any of the LED drivers 204 may connect to any number of LEDs.

The example of FIG. 4 illustrates the LED panel 206 with forty total LEDs for simplicity. In practice, the LED panel 206 may be implemented on the scale of hundreds of LEDs. The hundreds of LEDs produce light that passes through the LCD panel 208. The LCD panel 208 may be implemented on a scale of millions of pixels (e.g., a display with 4k resolution may have 3840×2160=8294400 pixels). Accordingly, a single LED may produce light that illuminates multiple pixels. In examples described above and herein, the LCD panel 208 includes one red pane, one green pane, and one blue pane per pixel. The RGB subpixels may be implemented as a rectangular grid of pixels positioned in front of the rectangular grid of LEDs.

When the TCON circuitry 202 sends polarization and color data that describes a new image frame to present, the structure of the LCD panel 208 may cause the pixels to update (e.g., the intensity of the RGB subpixels and the polarization of the corresponding liquid crystals to change) in a raster pattern. For example, the pixel update path 410 of FIG. 4 shows that pixels illuminated by the LED at (r1, c1) may update first, followed by pixels illuminated by the LED at (r1, c2), . . . , followed by pixels illuminated by the LED at (r1, c8), followed by pixels illuminated by the LED at (r2, c1), . . . , followed by pixels illuminated by the LED at (r5, c8). More generally, the time at which a particular pixel of the LCD panel 208 updates from a first image frame to a second image frame is dependent on the location of the pixel within the rectangular grid of RGB subpixels.

Some exiting eye fatigue reduction techniques attempt to connect LED drivers in a manner that is aligned with the pixel update path 410 (e.g., the configuration 402), but suffer implementation and performance restraints in doing so. In such a technique, the first of such LED drivers may be connected to all pixels in r1, while a second of such LED drivers are connected to all pixels in r2, etc. A TCON circuit may then attempt to reduce eye fatigue during an image frame transition by instructing the first LED driver to turn off the pixels in r1 before instructing the second LED driver, etc. However, such coordination between instructions to LED drivers adds complexity to the TCON circuit. The coordination also requires additional hardware to support multiple backlight interfaces as discussed above.

Furthermore, other LED drivers are limited to using a single signal to turn all connected LEDs on or off at the same time. Such an LED driver may turn all LEDs in r1 off when pixels illuminated by the LED at (r1, c1) begin to transition from a first image frame to a second image frame. However, the pixel update path 410 shows that RGB subpixels change intensities in a sequential manner. Accordingly, such an LED driver may cause the pixels illuminated by the LED at (r1, c8) to lose illumination a significant period of time before the RGB subpixels of said pixels update. The image is distorted by the lack of pixels during this time, causing a decrease in both image quality and viewing experience.

Advantageously, the delay registers 304 and the blank registers 306 of FIG. 3 enable the example LED driver circuitry 204A to turn the individual LEDs 310 off and on independently from one another. As a result, LED driver circuits implemented with the teachings described herein do not have to (but can if desired) connect to the LED panel 206 in a configuration that is aligned with the pixel update path 410. The LEDs connected to LED driver circuitry 204A (e.g., the LEDs 310 of FIG. 3) may be positioned in one row as shown in configuration 402, in two columns as shown in configuration 404, in a diagonal pattern as shown in configuration 406, in a circle as shown in configuration 408, or in any arbitrary configuration. Accordingly, the LED drivers 204 are applicable to a wider variety of display manufacturers than other LED drivers because some industry members desire the flexibility to connect the LED drivers 204 in any arbitrary configuration. Furthermore, the LED drivers 204 are also applicable to a wider variety of display manufacturers because they can connect to a TCON circuit with a single backlight communication channel (e.g., the TCON circuitry 202) as discussed above. The LED drivers 204 connect to the LED panel 206 in any arbitrary configuration, while also turning specific LEDs off during image frame transitions to reduce eye fatigue, using techniques discussed further in connection with FIGS. 5-7.

Figure 5:
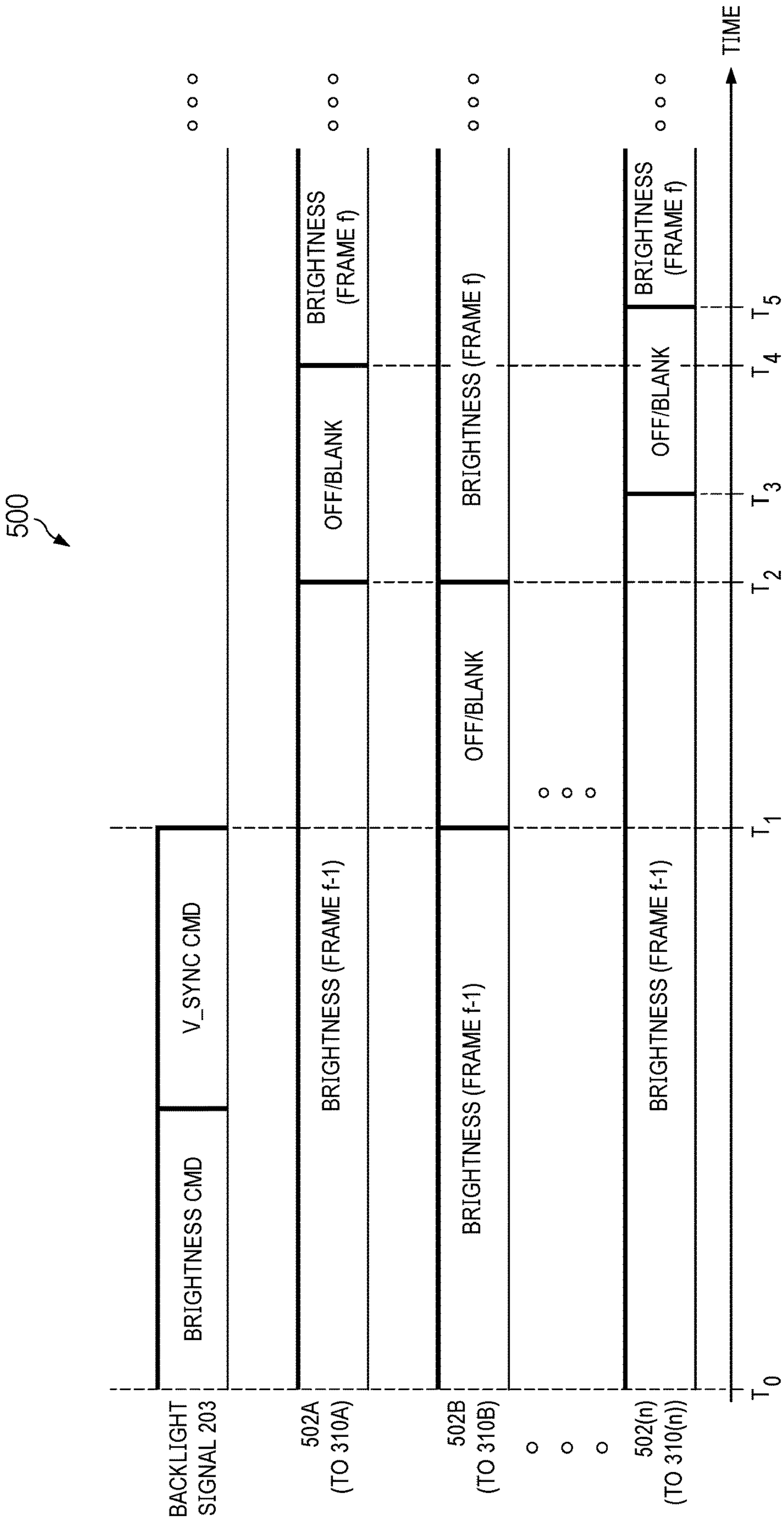
FIG. 5 is an illustrative example of signals received by and transmitted from an LED driver circuitry of FIG. 2.

FIG. 5 is an illustrative example of signals received by and transmitted from an LED driver circuitry of FIG. 2. The example of FIG. 5 includes the graph 500, which shows an example implementation of how the backlight signal 203 of FIG. 2, and example signals 502A, 502B, . . . , 502(*n*) change over time. In particular, the graph 500 shows an example implementation of how the foregoing signals change during a transition between image frames.

While turned on during an image frame, LEDs within the LED panel 206 may emit a variable amount of light. For example, the brightness of an LED may be proportional to the magnitude of a voltage applied across the diode, provided that the voltage is within an operating range of values. The variable brightness of LEDs in the LED panel 206 supports the presentation of images frames with wide differences in brightness, shading, contrast, etc.

The graph 500 shows the backlight signal 203 including brightness command data. The brightness command data describes the amount of light a given LED should emit per image frame. In the example of FIG. 5, the interface circuitry 308 begins to receive the brightness command data for image frame f at T0. As an example using the coordinate system of FIG. 4, the brightness command data may call for the LED at (r1, c1) to emit (0.2*C_max) units of light at image frame f, for the LED at (r1, c2) to emit (0.8*C_max) units of light at image frame f, . . . , and for the LED at (r8, c8) to emit (0.35*C_max) units of light at image frame f, where C_max is the maximum number of candelas an LED in the LED panel 206 can emit. More generally, the brightness command data describe brightness data for each LED in the LED panel 206. Moreover, the brightness data of a given LED is based on the scene in an image frame and may vary between adjacent LEDs.

The graph 500 shows the backlight signal 203 also includes V_SYNC data. As used above and herein, V_SYNC data describes when the transition from a first image frame to a second image frame occurs. The V_SYNC data enables the LED drivers 204 to synchronize operations relative to the image frame transition as discussed further below. In the example of FIG. 5, the V_SYNC data describes T1 as the beginning of the transition to image frame f. Accordingly, the time between T0 and T1 occur in the graph 500 represent a portion of the time in which the monitor 108 is presenting image frame f−1 (e.g., the previous image frame).

Advantageously, a LED driver circuitry 204A uses the start of the image frame transition (as described by the V_SYNC data) to calculate when the RGB subpixels that correspond to the connected LEDs 310 will update. The LED driver circuitry 204A then turns the LEDs 310: a) off at specific times so the RGB pane transition is not visible, and b) back on at specific times so that the LED panel 206 turns on in a pattern that mimics the LCD panel 208 update (e.g., a raster pattern). As a result, the LED drivers 204 reduces motion blue, reduces eye fatigue, and improves image quality during image frame transitions.

As described above in FIG. 4, the example LED drivers 204 may connect to the LED panel 206 in any arbitrary configuration. Therefore, while the LCD panel 208 updates between transition frames in a raster pattern, the LEDs 310 may update transition frames in an unrelated pattern or without any pattern. For example, the signals 502A, 502B, . . . , 502(*n*) show the voltage provided to the LEDs 310A, 310B, . . . , 310(*n*), respectively, by the LED driver circuitry 204A. The signal 502B shows the LED driver circuitry 204A turns the LED 310A off at T2 (after the image frame transition has started), the LED 310B off at T1 (when the image frame transition begins), and the LED 310(*n*) off at T3.

The LED driver circuitry 204A then turns the LED 310A back on at T4, LED 310B on at T2, and LED 310(*n*) back on at T5, respectively. In particular, the LED driver circuitry 204A begins the image frame f at the foregoing timestamps by applying a voltage to a particular LED based on the brightness command data received at T0. To do so, the control circuitry 302 determines which portions of the brightness command data are relevant to the LEDs 310 based on the position of the LEDs 310 within the LED panel 206.

Figure 6:
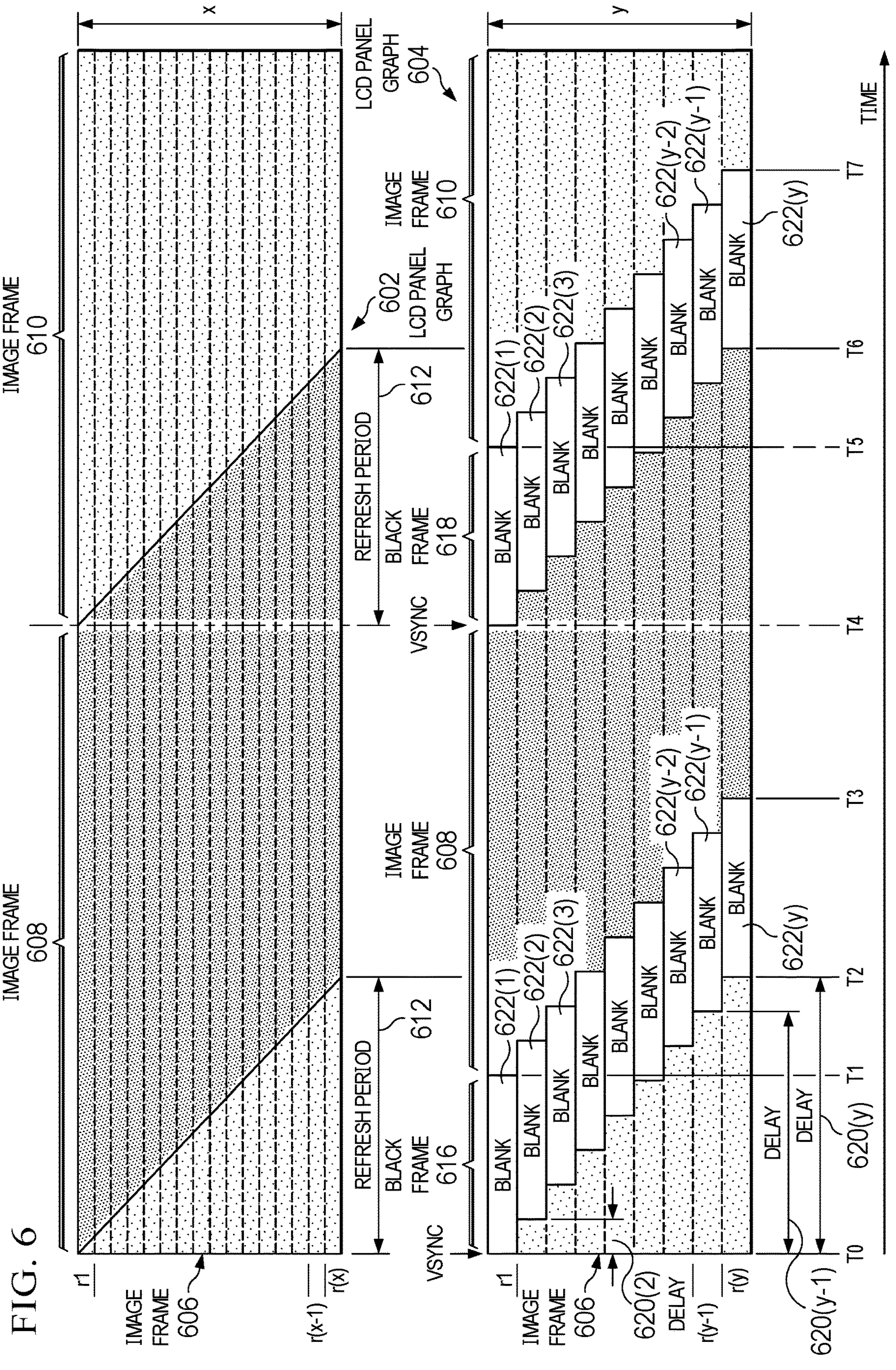
FIG. 6 is an illustrative example of operations performed by an LED driver circuitry of FIG. 2.

FIG. 6 is an illustrative example of operations performed by an LED driver circuitry of FIG. 2. FIG. 6 includes an example LCD panel graph 602 and an example LED panel graph 604. The LCD panel graph 602 includes example image frames 606, 608, and 610, and example refresh period 612. The example LED panel graph 604 includes the image frames 606, 608, and 610, example black frames 616 and 618, example delay periods 620(2), . . . , 620(*y*−1), and 620*y*, (collectively referred to as delay periods 620), and example blank periods 622(1), 622(2), . . . , 622(*y*) (collectively referred to as blank periods 622). The timestamps in FIG. 6 are independent of the timestamps in FIG. 5. Accordingly, the timelines of FIGS. 5 and 6 may refer to different periods of time.

The example LCD panel graph 602 shows how the LCD panel 208 updates over time to present a new image frame. In the LCD panel graph 602, the LCD panel 208 is represented with x rows, indicated as r1, r2, . . . , rx. Pixels in the top-most row, r1, begin to update (e.g., change the intensity of RGB subpixels and/or the orientation of polarization layers) from image frame 606 to image frame 608 at T0. Following the pixel update path 410 of FIG. 4, pixels in r2 begin to update after r1, pixels in r3 update after r2, etc., until the pixels in rx begin to update at T2.

The time between T0 and T2 is referred to as the refresh period 612. More generally, the refresh period 612 refers to the period when a first portion of the LCD panel 208 begins updating between image frames and when a final portion of the LCD begins updating between the same image frames. In some examples, the LCD panel 208 is implemented with a refresh period 612 in the scale of several milliseconds. In examples where the LCD panel 208 updates in a configuration other than the pixel update path 410, the refresh period 612 may refer to a different amount and/or unit of time.

Between T2 and T4, the entirety of the LCD panel 208 presents the image frame 608. During this time, the LCD panel 208 receives one or more of: color data, polarization data, and timing instructions for a subsequent image frame, from the TCON circuitry 202. Accordingly, the LCD panel graph 602 shows that pixels in r1 of the LCD panel 208 begin to update to image frame 610 at T4. The transition continues during another refresh period 612 and ends at T6, when pixels in rx begin to update.

The LED panel graph 604 shows how the LED drivers 204 update the LED panel 206 over time to present a new image frame. The LED panel graph 604 represents the LED panel 206 with y rows indicated as r(1), r(2), . . . , r(y). In the example of FIG. 4, y=5.

To reduce motion blur, the LED drivers 204 aim to turn individual lights in the LED panel 206 off whenever corresponding RGB subpixels are changing intensities. To maintain image quality, the LED drivers 204 also prevent the screen from simultaneously showing portions of two different image frames. During an image frame transition, some RGB subpixels begin changing intensities later than others (as shown in the LCD panel graph 602). Once a given set of RGB subpixels begins updating, an additional amount of time is required for the RGB subpixels to complete the update process. Industry members may refer to this amount of time as a gray-to-gray (GTG) period. More generally, a GTG period refers to the time it takes for a pixel to change from one shade of gray to another.

Prior to T0 in the example of FIG. 6, the LED drivers 204 turn the LED panel 206 on at brightness levels corresponding to image frame 606. The LED drivers 204 also receive (e.g., the LED drivers 204 distribute a common signal as described above) brightness and V_SYNC command data corresponding to image frame 608 before TO. The V_SYNC data indicates the LCD panel 208 will begin updating to image frame 608 at T0.

The LED drivers 204 use the V_SYNC data and the pixel update path 410 to turn LEDs off during the GTG period of corresponding pixels. For example, LEDs in r1 turn off at T0 (e.g., immediately at the beginning of the transition) because the pixel update path 410 indicates the RGB subpixels corresponding to those LEDs will update before any other panes. Generally, a monitor 108 is implemented with fewer LEDs than pixels. As a result, the LED panel 206 may contain fewer rows than the LCD panel 208 (e.g., y<x using the index variables of FIG. 6). Therefore, turning LEDs in r1 of the LED panel 206 off may result in multiple rows of pixels being unlit.

By T1, the pixels that correspond to r1 of the LED panel 206 have completed their respective GTG periods and have RGB subpixels set to display image frame 608. Accordingly, the LED drivers 204 turn the LEDs in r1 back on at T1. The time during which LEDs in r1 are turned off are labelled as blank period 622(1). A set of blank periods 622 that occur between image frames may be collectively referred to as a black frame. Accordingly, the LED panel graph 604 includes black frame 616 between image frames 606 and 608, and black frame 618 between image frames 608 and 610.

Because the pixel update path 410 follows a raster pattern, pixels that correspond to r2 of the LED panel 206 will begin to transition between image frames a proportional amount of time after pixels that correspond to r1 begin to transition. More generally, the delay periods 620 refer to the amount of time between the start of a given image frame transition and a particular row of pixels updating. Accordingly, delay period 620(2) refers to when the blank period 622(2) starts, . . . , delay period 620(*y*−1) refers to when the blank period 622(*y*−1) period starts, etc. The LED drivers 204 leverage the periodicity of the pixel update path 410 to turn determine delay periods 620 that are proportional to the index of the row of corresponding LEDs. For example, the LED drivers 204 coordinate to turn off LEDs such that the blank period 622(1) starts at T0, the delay period 620(2) period has size at (2×T_refresh/y), the delay period 620(3) has size T0+(3×T_refresh/y), . . . , and the 620(*y*) period starts at T0+(y×T_refresh/y)=T0+T_refresh, where T_refresh refers to the refresh period 612. As such, the LED drivers 204 turn LEDs in r1 off at T0, when the first RGB subpixels begin to update, and turn LEDs in r-y off at T0+T_refresh=T2, when the last RGB subpixels begin to update.

The LED drivers 204 turn a given row of LEDs on once a corresponding set of pixels have completed their GTG periods and are ready to display the subsequent image frame. Generally, the GTG periods of any two pixels are independent of location and approximately equal. Accordingly, the LED drivers 204 may configure the blank periods 622 to be approximately equal. Accordingly, the LED drivers 204 turn rows of LEDs back on using the same sequential pattern in which the rows were turned off. In the example of FIG. 6, LEDs in r1 turn on using brightness data for image frame 608 at T1, LEDs in r2 turn on brightness data for image frame 608 at T1+(2×T_refresh/y), . . . , and the LEDs in r-y turn on using brightness data for image frame 608 at T3. At T4 the foregoing operations repeat as both the LED panel 206 and the LCD panel 208 begin to update from image frame 608 to 610.

Notably, implementing the foregoing functionality does not require connecting all the LEDs in a given row to a common LED driver circuit. Rather, the LED drivers 204 may connect to the LED panel 206 in any arbitrary configuration and function collectively to turn rows of LEDs on and off as described above. For example, suppose the LED driver circuitry 204A connects to eight LEDs in a circular fashion as shown in configuration 408 of FIG. 4. Suppose further that within the set of eight LEDs, two LEDs are located in each of r1, r2, r3, and r4 of the LED panel 206. The LED driver circuitry 204A can use the V_SYNC data from the backlight signal 203 to determine that the connected LEDs in r1 should exhibit no delay period after T0, the connected LEDs in r2 should wait until delay period 620(2) ends before turning off, etc.

Advantageously, the LED driver circuitry 204A, 204B, . . . , 204(*z*) use the same V_SYNC information to independently determine delay times for the LEDs that correspond to a given controller. Suppose in the same example above, LED driver circuitry 204B connects to four LEDs in r(y−1) and four LEDs in r(y). After receiving a copy of the backlight signal 203 from the LED driver circuitry 204B, the LED driver circuitry 204B uses the V_SYNC data to determine that the connected LEDs in r(y−1) should wait until delay period 620(*y*−1) ends before turning off and that the connected LEDs in r(y) should wait until delay period 620(*y*) ends (e.g., wait until T1) before turning off.

Furthermore, the LED drivers 204 described herein can configure the delay period and/or blank period on a pixel-by-pixel basis. Within a given LED driver circuitry 204A, the interface circuitry 308 sets the delay period 620 of LED 310A using the value stored in delay register 304A and sets the blank period 622 of LED 310A using the blank register 306A. Because the control circuitry 302 stores values in the delay registers 304 and blank registers 306 independently from one another, the LED driver circuitry 204A could turn the LED 310A off/on with a different delay period/blank period than the LED 310B, even if both LEDs are positioned within the same row of the LED panel 206.

By enabling delay period and blank period configurability at an LED resolution, the LED drivers 204 improve image quality and reduce eye fatigue compared to other solutions. For example, while all LEDs in r1 turn off at T0 in FIG. 6, in other examples, the LED drivers 204 may cause the LED at (r1, c8) (using the FIG. 4 coordinate system) to turn off an amount of time later than the LED at (r1, c1) to account for the propagation delay of the pixel update path 410. The LED drivers 204 may also adjust the value of one or more blank periods to account for variations between the structure and operations of the RGB subpixels in the LCD panel 208. Also, the LED drivers 204 may adjust the value of one or more blank periods in response to a visual test performed by a human viewing the monitor 108. Accordingly, the LED drivers 204 can reduce eye fatigue and improve image quality while supporting a wide variety of variation between the types of connected LCD panels, TCON circuits, and user preferences.

While an example manner of implementing the LED driver circuitry 204A of FIG. 1 is illustrated in FIG. 3, one or more of the elements, processes, and/or devices illustrated in FIG. 3 may be combined, divided, re-arranged, omitted, eliminated, and/or implemented in any other way. Further, the example control circuitry 302, the example delay registers 304, the example blank registers 306, the example interface circuitry 308, and/or, more generally, the example LED driver circuitry 204A of FIG. 3, may be implemented by hardware alone or by hardware in combination with software and/or firmware. Thus, for example, any of the example control circuitry 302, the example delay registers 304, the example blank registers 306, the example interface circuitry 308, and/or, more generally, the example LED driver circuitry 204A, could be implemented by programmable circuitry in combination with machine-readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example LED driver circuitry 204A of FIG. 3 may include one or more elements, processes, and/or devices in addition to, or instead of, those illustrated in FIG. 3, and/or may include more than one of any or all of the illustrated elements, processes, and devices.

Figure 7:
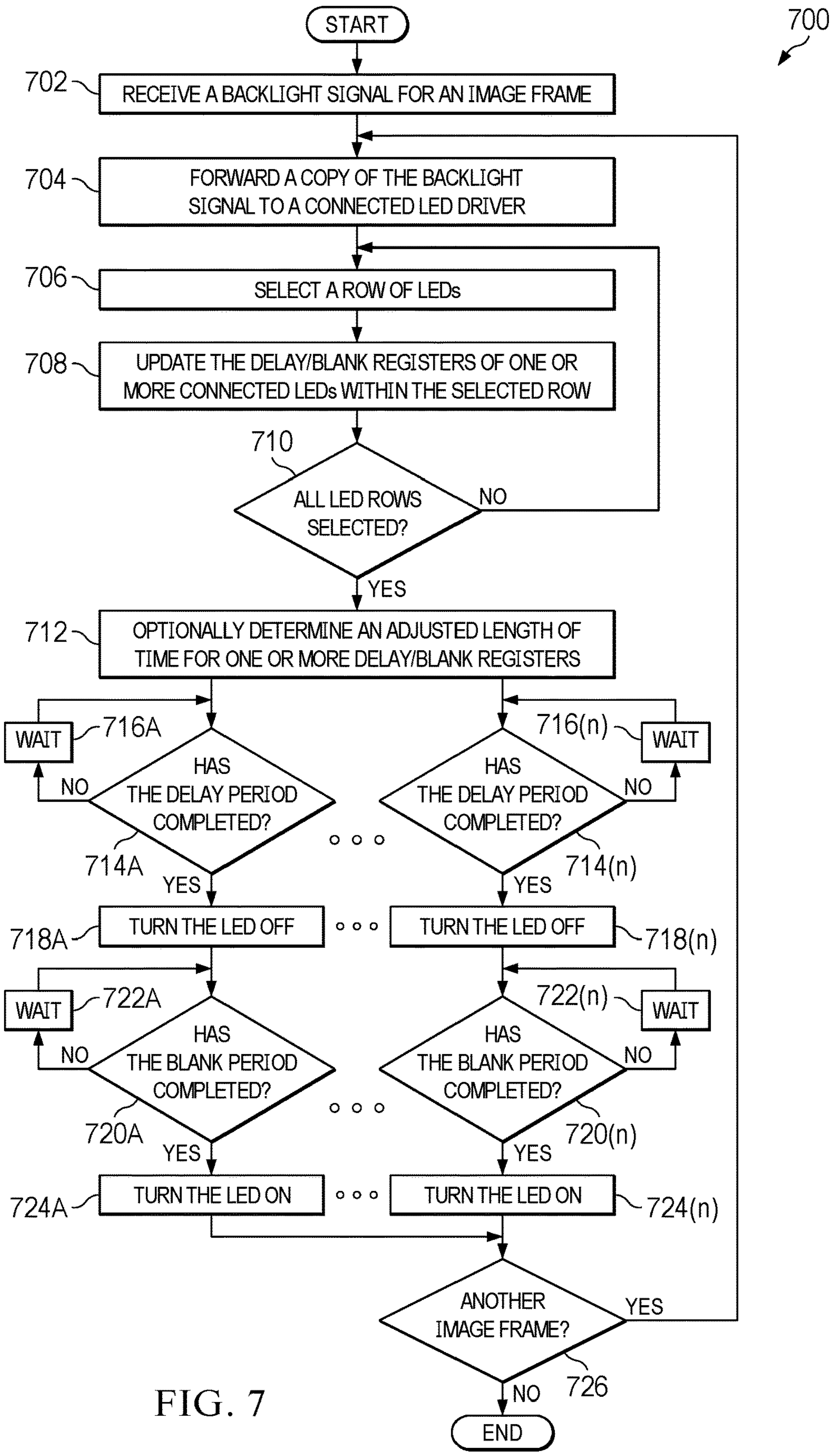
FIG. 7 is a flowchart representative of example machine-readable instructions and/or example operations that may be executed, instantiated, and/or performed using an example programmable circuitry implementation of the LED driver circuitry of FIG. 2.

Flowchart(s) representative of example machine-readable instructions, which may be executed by programmable circuitry to implement and/or instantiate the LED driver circuitry 204A of FIG. 3 and/or representative of example operations which may be performed by programmable circuitry to implement and/or instantiate the LED driver circuitry 204A of FIG. 3, are shown in FIG. 7. The machine-readable instructions may be one or more executable programs or portion(s) of one or more executable programs for execution by programmable circuitry such as the programmable circuitry 812 shown in the example programmable circuitry platform 800 described below in connection with FIG. 8 and/or may be one or more function(s) or portion(s) of functions to be performed by the example programmable circuitry (e.g., an FPGA). In some examples, the machine-readable instructions cause an operation, a task, etc., to be carried out and/or performed in an automated manner in the real world. As used herein, "automated" means without human involvement.

FIG. 7 is a flowchart representative of example machine-readable instructions and/or example operations 700 that may be executed, instantiated, and/or performed by programmable circuitry to implement an LED driver circuitry 204A. For example, the flowchart of FIG. 7 describes how the LED driver circuitry 204A updates LEDs to support an image frame transition. While examples described in connection with FIG. 7 refer to the LED driver circuitry 204A for simplicity, the machine-readable instructions and/or operations 700 may be also implemented by any of the other LED driver circuits 204B, . . . , 204(*z*).

The example machine-readable instructions and/or the example operations 700 of FIG. 7 begin when the interface circuitry 308 receives the backlight signal 203. (Block 702). The backlight signal 203 includes brightness data and V_SYNC data that describe an upcoming image frame and black frame, respectively.

In the example of FIG. 1, the LED driver circuitry 204A receives the backlight signal 203 directly from the TCON circuitry 202 while the other LED driver circuits 204B, . . . , 204(*z*) receive the backlight signal 203 from one another. Accordingly, the interface circuitry 308 then forwards a copy of the backlight signal to a connected LED driver circuitry 204B. (Block 704). Through such forwarding, the individual LED driver circuitry 204A, 204B, . . . , 204(*z*) can receive the same brightness and V_SYNC data.

The control circuitry 302 selects a row of LEDs within the LED panel 206. (Block 706). The LED panel 206 may have any number of LEDs arranged in a grid format and therefore may have any number of rows and columns.

The control circuitry 302 updates the delay registers 304 and/or blank registers 306 of one or more connected LEDs within the selected row. (Block 708). For example, the control circuitry 302 may set one or more delay registers 304 to T0+(rx T_refresh/y), where TO refers to the start of the image frame transition as indicated in the backlight signal 203, r refers to the index of the selected row, T_refresh refers to the refresh period 612, and y refers to the total number of rows in the LED panel 206. The control circuitry 302 may also set one or more blank registers 306 to an average GTG period of the LCD panel 208.

The control circuitry 302 determines whether all LED rows have been selected. (Block 710). If all rows have not been selected (Block 710: No), the machine-readable instructions and/or operations 700 return to block 706 where the control circuitry 302 selects another row of LEDs from the LED panel 206.

If all rows have been selected (Block 710: Yes), the control circuitry 302 optionally determines an adjusted length of time for one or more delay registers 304 and/or blank registers 306. (Block 712). For example, the control circuitry 302 may adjust a particular delay register to account for the propagation delay of the pixel update path 410. The control circuitry 302 may also adjust the value of one or more blank registers 306 to account for variations between the structure and operations of the RGB subpixels in the LCD panel 208. Also, the control circuitry 302 may adjust the value of one or more blank registers 306 in response to user preference (e.g., based on a visual test performed by a human viewing the monitor 108). The result of the adjustments may expand or contract the delay periods and blank periods (e.g., result in an addition or subtraction of time) relative to the original register values determined at block 708.

The LED driver circuitry 204A implements one set of blocks 714-724 for a given connected LED. For example, blocks 714A-724A correspond to LED 310A of FIG. 3, blocks 714B-724B for LED 310B, . . . , and blocks 714(*n*)-724(*n*) correspond to LED 310(*n*). Also, the LED driver circuitry 204A may implement the blocks 714-724 in parallel with one another to turn individual connected LEDs 310 on and off independently of one another.

The control circuitry 302 checks whether the delay period for LED 310A has been completed. (Block 714A). To do so, the control circuitry 302 compares the value in the delay register 304A to a clock signal. The delay registers 304 may indicate when a delay period completes by listing an end time (e.g., the period ends at a certain epoch time), by listing a duration (e.g., the period ends a certain number of microseconds after the image frame transition period begins, etc.), and/or any using any suitable technique to store data that measures the passage of time. In parallel, the control circuitry 302 also checks whether the delay period for LED 310B has completed (Block 714B), . . . , and whether the delay period for LED310(*n*) has completed (Block 714(*n*)).

If the delay period for LED 310A has not been completed (Block 714A: No), the control circuitry 302 waits for a period (block 716A) before returning to block 714A and re-comparing a clock signal to the value in the delay register 304A. If the delay period for LED 310A has completed (Block 714A: Yes), the control circuitry 302 causes the interface circuitry 308 to turn the LED 310A off (Block 718A). Similarly, if the delay period for LED 310B has completed (Block 714B: Yes), the control circuitry 302 causes the interface circuitry 308 to turn the LED 310B off (Block 718B), . . . , and if the delay period for LED 310(*n*) has completed (Block 714(*n*): Yes), the control circuitry 302 causes the interface circuitry 308 to turn the LED 310(*n*) off (Block 718(*n*)).

While the LED 310A is off, the control circuitry 302 determines whether the blank period has completed (Block 720A). To do so, the control circuitry 302 compares the value in the blank register 306A to a clock signal. The blank registers 306 may indicate when a blank period is completed using any suitable technique to store data that measures the passage of time. In parallel, the control circuitry 302 also checks whether the blank period for LED 310B has completed (Block 720B), . . . , and whether the blank period for LED310(*n*) has completed (Block 720(*n*)).

If the blank period for LED 310A has not been completed (Block 720A: No), the control circuitry 302 waits for a period (block 722A) before returning to block 712A and re-comparing a clock signal to the value in the blank register 306A. If the blank period for LED 310A has completed (Block 714A: Yes), the control circuitry 302 causes the interface circuitry 308 to turn the LED 310A back on (Block 724A). The interface circuitry 308 turns a given LED 310A on by applying a specific voltage indicated by the brightness data. As a result, the LED 310A emits a specific amount of light required for the subsequent image frame at block 724A. Similarly, the interface circuitry 308 turns LED 310B on to emit a specific amount of light at block 724B, . . . , and turns LED 310(*n*) on to emit a specific amount of light at block 724(*n*).

The control circuitry 302 determines whether the backlight signal 203 includes additional brightness and V_SYNC data to support another image frame. (Block 726). If the backlight signal 203 does support an additional image frame (Block 726: Yes), control returns to block 704 where the interface circuitry 308 forwards a copy of the additional brightness and V_SYNC data to a connected LED driver circuitry 204B. If the backlight signal 203 does not support an additional image frame (Block 726: No), the machine-readable instructions and/or operations 700 end.

Additional brightness and V_SYNC data supporting an image frame (Block 726: Yes) may be provided by the TCON circuitry 202 some amount of time after the transitioned between image frames (e.g., a black frame as shown in FIG. 6) ends. Notably, a transition between image frame ends when the LED drivers 204 collectively turn LEDs in the LED panel 206 back on. Accordingly, The LED driver circuitry 204A may wait for a period after executing blocks 724 before receiving additional data for another image frame (Block 726: Yes). During the foregoing waiting period, the blank periods of other LEDs complete, causing other LED driver circuits 204B, . . . , 204(*z*) turn said LEDs on.

Figure 8:
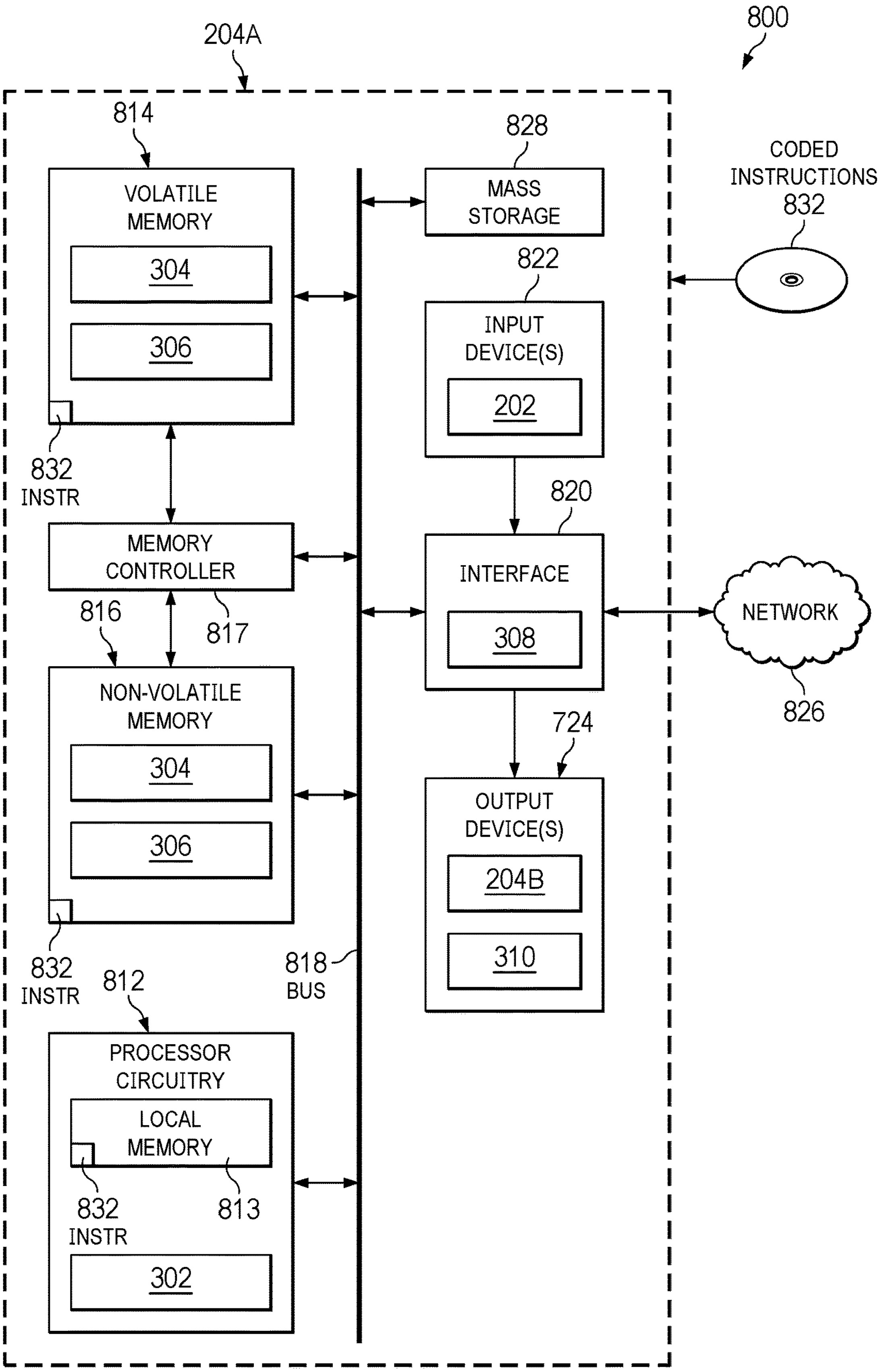
FIG. 8 is a block diagram of an example processing platform including programmable circuitry structured to execute, instantiate, and/or perform the example machine-readable instructions and/or perform the example operations of FIG. 7 to implement the LED driver circuitry of FIG. 3.

FIG. 8 is a block diagram of an example programmable circuitry platform 800 structured to execute and/or instantiate the example machine-readable instructions and/or the example operations of FIG. 7 to implement the LED driver circuitry 204A of FIG. 3. In some examples, the programmable circuitry platform 800 implements one or more additional components from the display circuitry 110 The programmable circuitry platform 800 can be, for example, a server, a personal computer, a workstation, a television, a monitor, a projector, or any other type of computing and/or electronic device using an LED panel.

The programmable circuitry platform 800 of the illustrated example includes programmable circuitry 812. The programmable circuitry 812 of the illustrated example is hardware. For example, the programmable circuitry 812 can be implemented by one or more integrated circuits, logic circuits, FPGAs, microprocessors, CPUs, GPUs, DSPs, and/or microcontrollers from any desired family or manufacturer. The programmable circuitry 812 may be implemented by one or more semiconductor based (e.g., silicon based) devices. In this example, the programmable circuitry 812 implements the control circuitry 302. In some examples, the programmable circuitry 812 additionally or alternatively implements the GPU 106 and/or the TCON circuitry 202.

The programmable circuitry 812 of the illustrated example includes a local memory 813 (e.g., a cache, registers, etc.). The programmable circuitry 812 of the illustrated example is in communication with main memory 814, 816, which includes a volatile memory 814 and a non-volatile memory 816, by a bus 818. The volatile memory 814 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 816 may be implemented by flash memory and/or any other desired type of memory device. Access to the main memory 814, 816 of the illustrated example is controlled by a memory controller 817. In some examples, the memory controller 817 may be implemented by one or more integrated circuits, logic circuits, microcontrollers from any desired family or manufacturer, or any other type of circuitry to manage the flow of data going to and from the main memory 814, 816. In the example of FIG. 8, the main memory 814, 816 implements the delay registers 304 and the blank registers 306.

The programmable circuitry platform 800 of the illustrated example also includes interface circuitry 820. The interface circuitry 820 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 822 are connected to the interface circuitry 820. The input device(s) 822 permit(s) a user (e.g., a human user, a machine user, etc.) to enter data and/or commands into the programmable circuitry 812. In the example of FIG. 8, the input device(s) 822 includes the TCON circuitry 202. In examples in which the programmable circuitry platform 800 implements the display circuitry 110, the input device(s) 822 may additionally or alternatively be implemented by, for example, an audio sensor, a microphone, a camera (still or video), a keyboard, a button, a mouse, a touchscreen, a trackpad, a trackball, an isopoint device, and/or a voice recognition system.

One or more output devices 824 are also connected to the interface circuitry 820 of the illustrated example. In the example of FIG. 8, the output device(s) 824 includes the LEDs 310 and the LED driver circuitry 204B. In examples in which the programmable circuitry platform 800 implements the display circuitry 110, the output device(s) 824 may additionally or alternatively be implemented by, for example, by display devices (e.g., a light emitting diode (LED) panel, an organic light emitting diode (OLED), a liquid crystal display (LCD), a cathode ray tube (CRT) display, an in-place switching (IPS) display, a touchscreen, etc.).

The interface circuitry 820 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 826. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 800 of the illustrated example also includes one or more mass storage discs or devices 828 to store firmware, software, and/or data. Examples of such mass storage discs or devices 828 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine-readable instructions 832, which may be implemented by the machine-readable instructions of FIG. 7, may be stored in the mass storage device 828, in the volatile memory 814, in the non-volatile memory 816, and/or on at least one non-transitory computer readable storage medium such as a CD or DVD which may be removable. In some examples, the machine-readable instructions additionally implement the application 104.

In this description, the term "and/or" (when used in a form such as A, B and/or C) refers to any combination or subset of A, B, C, such as: (a) A alone; (b) B alone; (c) C alone; (d) A with B; (e) A with C; (f) B with C; and (g) A with B and with C. Also, as used herein, the phrase "at least one of A or B" (or "at least one of A and B") refers to implementations including any of: (a) at least one A; (b) at least one B; and (c) at least one A and at least one B.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Numerical identifiers such as "first", "second", "third", "fourth", etc. are used merely to distinguish between elements of substantially the same type in terms of structure and/or function. These identifiers as used in the detailed description do not necessarily align with those used in the claims.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Unless otherwise stated, "about" "approximately," or "substantially" preceding a value means+/−10 percent of the stated value, or, if the value is zero, a reasonable range of values around zero.

The program to implement and/or instantiate the LED driver circuitry 204A of FIG. 3 may be embodied in instructions (e.g., software and/or firmware) stored on one or more non-transitory computer readable and/or machine-readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine-readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine-readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIG. 7, many other methods of implementing the example LED driver circuitry 204A may alternatively be used. For example, the order of execution of the blocks of the flowchart(s) may be changed, and/or some of the blocks described may be changed, eliminated, or combined. Also, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine-readable instructions described herein may be stored in one or more of a compressed format, an encrypted format, a fragmented format, a compiled format, an executable format, a packaged format, etc. Machine-readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine-readable instructions may be fragmented and stored on one or more storage devices, disks and/or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine-readable instructions may be stored in multiple parts, which are individually compressed, encrypted, and/or stored on separate computing devices. The parts when decrypted, decompressed, and/or combined form a set of computer-executable and/or machine executable instructions that implement one or more functions and/or operations that may together form a program such as that described herein.

In another example, the machine-readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, machine-readable, computer readable and/or machine-readable media, as used herein, may include instructions and/or program(s) regardless of the particular format or state of the machine-readable instructions and/or program(s).

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 7 may be implemented using executable instructions (e.g., computer readable and/or machine-readable instructions) stored on one or more non-transitory computer readable and/or machine-readable media. As used herein, the terms non-transitory computer readable medium, non-transitory computer readable storage medium, non-transitory machine-readable medium, and/or non-transitory machine-readable storage medium are expressly defined to include any type of computer readable storage device and/or storage disk and to exclude propagating signals and to exclude transmission media. Examples of such non-transitory computer readable medium, non-transitory computer readable storage medium, non-transitory machine-readable medium, and/or non-transitory machine-readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms “non-transitory computer readable storage device” and “non-transitory machine-readable storage device” are defined to include any physical (mechanical, magnetic and/or electrical) hardware to retain information for a time period, but to exclude propagating signals and to exclude transmission media. Examples of non-transitory computer readable storage devices and/or non-transitory machine-readable storage devices include random access memory of any type, read only memory of any type, solid state memory, flash memory, optical discs, magnetic disks, disk drives, and/or redundant array of independent disks (RAID) systems. As used herein, the term “device” refers to physical structure such as mechanical and/or electrical equipment, hardware, and/or circuitry that may or may not be configured by computer readable instructions, machine-readable instructions, etc., and/or manufactured to execute computer-readable instructions, machine-readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a," "an," "first," "second," etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

Modifications are possible in the described embodiments, and other embodiments are possible, within the scope of the claims.

From the foregoing, it will be appreciated that example systems, apparatus, articles of manufacture, and methods have been described that reduce eye fatigue and improve image quality by controlling backlight drivers. Described systems, apparatus, articles of manufacture, and methods improve the efficiency of using a computing device by using a series of connected LED drivers that share a common signal from time control circuitry. A given LED driver circuitry includes registers that may be used to store a unique delay period and blank period for the individual connected LEDs. The LED driver circuitry uses the delay period to turn a particular connected LED off when corresponding RGB subpixels begin to change between image frames. The LED driver circuitry also uses the blank period to turn the particular LED back on when the corresponding RGB subpixels have completed the transition to the subsequent image frame (e.g., based on the gray-to-gray time). Described systems, apparatus, articles of manufacture, and methods are accordingly directed to one or more improvement(s) in the operation of a machine such as a computer or other electronic and/or mechanical device.

The following claims are hereby incorporated into this Detailed Description by this reference. Although certain example systems, apparatus, articles of manufacture, and methods have been described herein, the scope of coverage of this patent is not limited thereto. On the contrary, this patent covers all systems, apparatus, articles of manufacture, and methods fairly falling within the scope of the claims of this patent.

What is claimed is:

1. Circuitry comprising:
memory; and
programmable circuitry capable of:
turning a first Light Emitting Diode (LED) off at a first time, the first time determined by a transition of a first image frame to a second image frame, the first and second image frames displayed in a Liquid Crystal Display (LCD) panel; and
turning the first LED on at a second time, the second time determined by a refresh rate of the LCD panel;
wherein:
the first LED corresponds to a pixel in the LCD panel,
the pixel begins to transition from the first image frame to the second image frame at the first time; and
the pixel completes the transition from the first image frame to the second image frame at the second time.

2. The circuitry of claim 1, wherein the programmable circuitry is further capable of determining the third second time based on a gray-to-gray time of the LCD panel.

3. The circuitry of claim 2, wherein the programmable circuitry is further capable of:
determining a length of time based on one of the gray-to-gray time, a refresh period of the LCD panel, and a position of the first LED;
receiving an adjusted length of time; and
determining the second time by adding the adjusted length of time to the first time.

4. The circuitry of claim 1, wherein the programmable circuitry is further capable of storing values representing the first time and the second time within separate registers in the memory.

5. The circuitry of claim 1, further includes:
a first LED driver circuit; and
wherein the first LED driver circuit includes the programmable circuitry further capable of:
receiving a signal from time control circuitry, the signal indicative of the LCD panel begins to transition from the first image frame to the second image frame, the first and second image frames displayed in a LCD panel; and
forwarding a copy of the signal to a second LED driver circuit.

6. The circuitry of claim 1, further including interface circuitry to connect to a subset of LEDs in a plurality of LEDs, the subset including the first LED.

7. The circuitry of claim 1, wherein:
the first LED is within a plurality of LEDs;
the programmable circuitry is further capable of:
selecting a second LED within the plurality of LEDs;
turning the second LED off at a third time, the third time determined by a transition of the first image frame to the second image frame, the first and second image frames displayed in the LCD panel, the third time between the first and second time; and turning the second LED on at a fourth time, the fourth time determined on the refresh rate of the LCD panel and a position of the second LED within the plurality of LEDs;

the second LED corresponds to a pixel in the LCD panel;

the pixel begins to transition from the first image frame to the second image frame at the third time; and the pixel completes the transition from the first image frame to the second image frame at the fourth time.

8. A method comprising:

turning a first Light Emitting Diode (LED) off at a first time, by programmable circuitry, the first time determined by a transition of a first image frame to a second image frame, the first and second image frames displayed in a Liquid Crystal Display (LCD) panel; and turning the first LED on at a second time, the second time determined by a refresh rate of the LCD panel; and wherein:

the first LED corresponds to a pixel in the LCD panel;

the pixel begins to transition from the first image frame to the second image frame at the first time; and the pixel completes the transition from the first image frame to the second image frame at the second time.

9. The method of claim 8, further including determining the second time determined by a gray-to-gray time of the LCD panel.

10. The method of claim 9, further including:

determining a length of time based on one of the gray-to-gray time, a refresh period of the LCD panel, and a position of the first LED;

receiving an adjusted length of time; and determining the second time by adding the adjusted length of time to the first time.

11. The method of claim 8, further including storing values representing the first time and the second time within separate registers in memory.

12. The method of claim 8, wherein:

the programmable circuitry is a first programmable circuitry; and the method further includes:

receiving a signal indicative of when the LCD panel begins to transition from the first image frame to the second image frame, the first and second image frames displayed in the LCD panel; and forwarding a copy of the signal to a second programmable circuitry.

13. The method of claim 8, further including connecting to a subset of LEDs in the plurality of LEDs, the subset including the first LED.

14. The method of claim 8, wherein:

the first LED is within a plurality of LEDs;

the method further comprises:

selecting, by a programmable circuitry platform, a second LED within the plurality of LEDs;

turning, by the programmable circuitry platform, the second LED off at a third time, the third time determined by a transition of a first image frame to a second image frame, the first and second image frames displayed in the LCD panel, the third time between the first and second time;

determining, by the programmable circuitry platform, a fourth time determined by the refresh rate of the display panel and a position of the second LED within the plurality of LEDs; and turning, by the programmable circuitry platform, the second LED on at the fourth time, the fourth time determined by the refresh rate of the display panel and a position of the second LED within the plurality of LEDs;

the second LED corresponds to a pixel in the LCD panel;

the pixel begins to transition from the first image frame to the second image frame at the third time; and the pixel completes the transition from the first image frame to the second image frame at the fourth time.

15. A system comprising:

a display panel;

time control circuitry capable of indicating when the display panel will transition from a first image frame and a second image frame on the display panel;

a first Light Emitting Diode (LED) within the display panel; and programmable circuitry connected to the LED, the programmable circuitry capable of:

turning the first LED off at a first time, the first time determined by the transition; and wherein:

the display panel further includes a liquid crystal display (LCD) panel; and the programmable circuitry is further capable of:

turning the first LED on at a second time, the second time determined by a refresh rate of the LCD panel;

the LCD panel includes a grid of pixels;

a pixel corresponding to the first LED begins to transition from the first image frame to the second image frame at the first time, the first and second image frames displayed in the LCD panel; and the pixel completes the transition from the first image frame to the second image frame at the second time, the first and second image frames displayed in the LCD panel.

16. The system of claim 15, wherein the programmable circuitry is further capable of determining the second time based on a gray-to-gray time of the LCD panel.

17. The system of claim 16, wherein the programmable circuitry is further capable of:

determining a length of time based on one of the gray-to-gray time, a refresh period of the display panel, and a position of the first LED;

receiving an adjusted length of time; and determining the second time by adding the adjusted length of time to the first time.

18. The system of claim 15, wherein:

the programmable circuitry is further capable of storing values representing the first time and the second time within separate registers in memory.

19. The system of claim 15, wherein:

the programmable circuitry includes a first circuitry; and the programmable circuitry is further capable of:

receiving a signal from time control circuitry, the signal indicative of when a displaying panel begins to transition from the first image frame to the second image frame; and forwarding a copy of the signal to a second LED driver circuit.

20. The system of claim 15, wherein:

the first LED is one of a plurality of LEDs within the display panel; and the programmable circuitry is coupled to the plurality of LEDs, the programmable circuitry capable of:

selecting a second LED from the plurality of LEDs;

turning the second LED off at a third time, the third time determined by the transition of a first image frame to a second image frame, the first and second image frames displayed in the LCD panel, the third time between the first and second times; and turning the second LED on at a fourth time, the fourth time determined by the refresh rate of the display panel and a position of the second LED within the plurality of LEDs; and wherein the second LED corresponds to a pixel in the LCD panel;

the pixel begins to transition from the first image frame to the second image frame at the third time; and the pixel completes the transition from the first image frame to the second image frame at the fourth time.

* * * * *